United States Patent
Jones et al.

(10) Patent No.: US 7,010,049 B1
(45) Date of Patent: Mar. 7, 2006

(54) OFDM CHANNEL ESTIMATION IN THE PRESENCE OF INTERFERENCE

(75) Inventors: Vincent K. Jones, Redwood City, CA (US); Jonathan Leary, San Francisco, CA (US); James M. Gardner, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 34 days.

(21) Appl. No.: 10/263,454

(22) Filed: Oct. 2, 2002

Related U.S. Application Data

(63) Continuation of application No. 09/410,945, filed on Oct. 4, 1999, now Pat. No. 6,487,253.

(51) Int. Cl.
*H04L 27/00* (2006.01)
*H04K 1/10* (2006.01)
*H03D 1/00* (2006.01)

(52) U.S. Cl. .................. 375/259; 375/260; 375/340

(58) Field of Classification Search ............... 375/347, 375/229–231, 340, 259; 370/206

See application file for complete search history.

(56) References Cited

U.S. PATENT DOCUMENTS

| | | | | |
|---|---|---|---|---|
| 5,732,113 A | * | 3/1998 | Schmidl et al. | 375/355 |
| 6,298,035 B1 | * | 10/2001 | Heiskala | 370/208 |
| 6,314,147 B1 | * | 11/2001 | Liang et al. | 375/346 |
| 6,327,314 B1 | | 12/2001 | Cimini et al. | 342/378 |
| 6,330,294 B1 | * | 12/2001 | Ansbro et al. | 375/347 |
| 6,442,130 B1 | * | 8/2002 | Jones et al. | 370/208 |
| 6,611,551 B1 | * | 8/2003 | Jones et al. | 375/219 |

FOREIGN PATENT DOCUMENTS

WO    WO 98/09385    3/1998

OTHER PUBLICATIONS

Horn et al., "Matrix analysis", 1986, Cambridge University Press, pp. 18-19.
Jones et al., "Improved OFDM channel identification", 1999, U.S. Appl. No. 09/234,929.
Jones et al., "Improved system for interference cancellation", 1999, U.S. Appl. No. 09/234,629.

* cited by examiner

*Primary Examiner*—Stephen Chin
*Assistant Examiner*—Cicely Ware
(74) *Attorney, Agent, or Firm*—Dov Rosenfeld; Inventek; Dan Lang

(57) ABSTRACT

Systems and methods for estimating channel response in the presence of interference. Interference and/or noise present on received training symbols is estimated. Based on the measured noise and/or interference, a weighting among training symbols is developed. Channel response is then estimated based on a weighted least squares procedure.

10 Claims, 5 Drawing Sheets

OFDM CHANNEL ESTIMATION IN THE PRESENCE OF INTERFERENCE

This is a continuation of application Ser. No. 09/410,945, filed Oct. 4, 1999, now U.S. Pat. No. 6,487,253, which is hereby incorporated by reference.

BACKGROUND OF THE INVENTION

The present application relates to digital communications and more particularly to systems and methods for estimating the response of a channel between two nodes of a communication network.

Orthogonal frequency division multiplexing (OFDM) systems offer significant advantages in many real world communication systems, particularly in environments where multipath effects impair performance. OFDM divides the available spectrum within a channel into narrow subchannels. In a given so-called "burst," each subchannel transmits one data symbol. Each subchannel therefore operates at a very low data rate compared to the channel as a whole. To achieve transmission in orthogonal subchannels, a burst of frequency domain symbols are converted to the time domain by an IFFT procedure. To assure that orthogonality is maintained in dispersive channels, a cyclic prefix is added to the resulting time domain sequence. The cyclic prefix is a duplicate of the last portion of the time domain sequence that is appended to the beginning. To assure orthogonality, the cyclic prefix should be at least as long as the duration of the impulse response of the channel.

To maximize the performance of an OFDM system, it is desirable that the response of the channel be known at the receiver end of the link. To provide the receiver with knowledge of the channel response, the transmitter typically includes training symbols as part of the frequency domain burst. The training symbols have known values when transmitted and their values as received may be used in determining the channel response.

One technique for estimating channel response based on received training symbol values is disclosed in WO 98/09385, the contents of which are herein incorporated by reference. A modification of this channel estimation technique that takes into account channel components having known response is disclosed in U.S. application Ser. No. 09/234,929, the contents of which are herein incorporated by reference.

Typically, the training symbols are interspersed among the data symbols in the frequency domain burst. A limited number of such training symbols are sufficient to characterize the overall channel response. A problem arises, however, if a narrow band interferer signal corrupts reception of a particular training symbol. The value of that training symbol as received will then reflect not only the channel response but also the interference. This will cause the channel estimation procedure to misestimate the channel response at the training symbol position and at surrounding data symbol positions within the frequency domain.

What is needed is a technique that will provide improved estimation of channel response in an OFDM system in the presence of interference that corrupts transmission of training information.

SUMMARY OF THE INVENTION

Systems and methods for estimating channel response in the presence of interference are provided by virtue of the present invention. Interference and/or noise present on received training symbols is estimated. Based on the measured noise and/or interference, a weighting among training symbols is developed. Channel response is then estimated based on a weighted least squares procedure.

According to one aspect of the present invention, a method for estimating a channel response in a digital communication system includes: receiving a time domain OFDM burst, converting the time domain OFDM burst to a frequency domain OFDM burst, extracting a vector of training symbols having known transmitted values from the frequency domain OFDM burst, determining weights for the training symbols based on measured noise and/or interference, and using the weights and the training symbols to estimate the channel response.

A further understanding of the nature and advantages of the inventions herein may be realized by reference to the remaining portions of the specification and the attached drawings.

DESCRIPTION OF SPECIFIC EMBODIMENTS

The present invention will be described in reference to the use of OFDM (Orthogonal Frequency Division Multiplexing) for communication of data. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an IFFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \ldots z(N)]^T \mapsto [z(N-\mu+1) \ldots z(N)z(1) \ldots z(N)]^T$$

On the receive end, the cyclic prefix is removed from the received time domain symbols. An FFT is then applied to recover the simultaneously transmitted frequency domain symbols. The cyclic prefix has length $\mu$ where $\mu$ is greater than or equal to a duration of the impulse response of the overall channel and assures orthogonality of the frequency domain subchannels.

There are other ways of simultaneously transmitting a burst of symbols in orthogonal channels or substantially orthogonal channels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels. The term frequency domain should be understood to refer to any domain that is divided into such orthogonal or substantially orthogonal subchannels.

Figure 1:
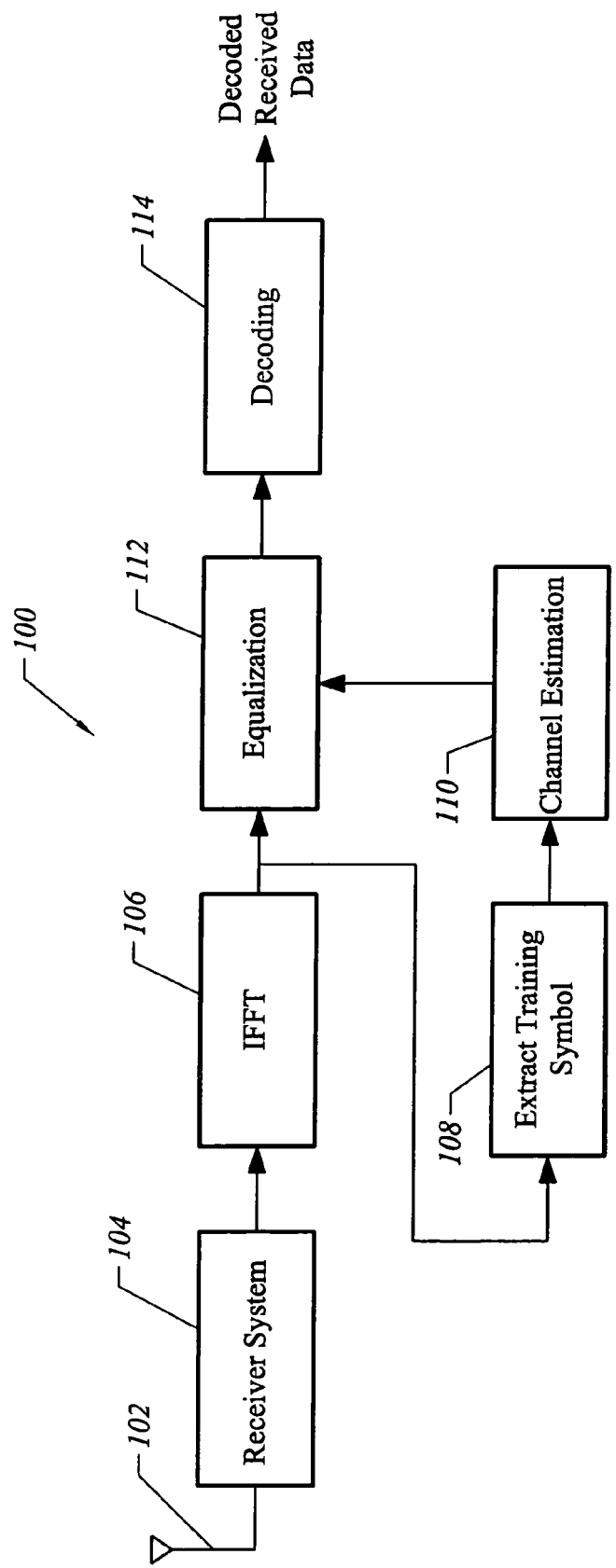
FIG. 1 depicts a system for receiving OFDM signals according to one embodiment of the present invention.

FIG. 1 depicts a system 100 for receiving OFDM signals carrying embedded training information according to one embodiment of the present invention. RF carrier signals modulated with successive time domain OFDM bursts are received via an antenna 102. A receiver system 104 filters and amplifies the received RF signals, converts the RF signals to an intermediate frequency (IF), filters and amplifies the IF signals, downconverts the IF signal to baseband, and performs further baseband processing including converting the analog baseband signal to a digital signal representing a series of time domain OFDM bursts.

The time domain OFDM bursts are converted to the frequency domain by an IFFT stage 106. The training symbols are extracted from each burst by a training symbol extraction block 108. Each frequency domain OFDM burst includes both training symbols and data symbols. The transmitted values of the training symbols are known by a channel estimation block 110. Based on the values of the extracted training symbols, channel estimation block 110 estimates the channel response experienced by each burst. Each channel estimate response consists of a complex channel response value for each frequency domain symbol position. An equalization block 112 corrects the received value for each frequency domain data symbol by dividing the received value by the channel response value at its frequency domain position. A decoding stage 114 decodes any channel codes applied by the transmitter including but not limited to, e.g., convolutional coding, trellis coding, Reed-Solomon coding, etc.

Figure 2:
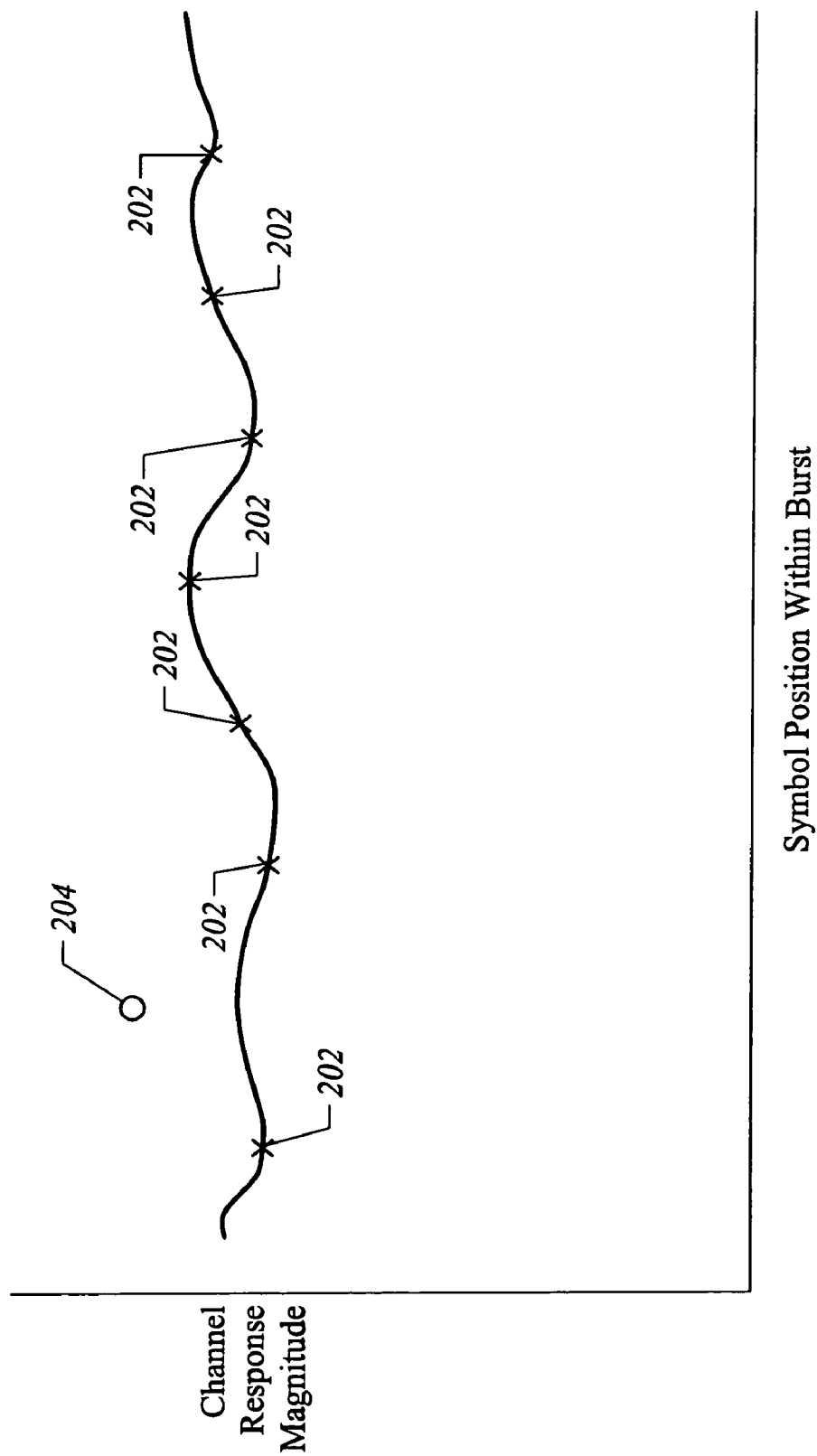
FIG. 2 is a graph of channel response magnitude over frequency depicting the effects of interference on a channel response estimate.

The values of the training symbols as received will be affected not only by the channel response but also by noise and/or interference. FIG. 2 depicts channel response magnitude over frequency within a burst. Training symbols 202 are spaced periodically throughout the burst. As can be seen, the received values of training symbols 202 will be affected by the channel response. The second training symbol from the left is also, however, affected by the presence of a narrow band interferer coincident with that training symbol's frequency position. Its value as received is marked by a designator 204. The received value includes the effects of the narrow band interference. Employing the prior art channel estimation techniques, the corrupted received training symbol value 204 will affect the channel response estimate over a range between delimiters 206. The present invention provides systems and methods for reducing the effects of narrow band interferers superimposed on training symbols.

Figure 3:
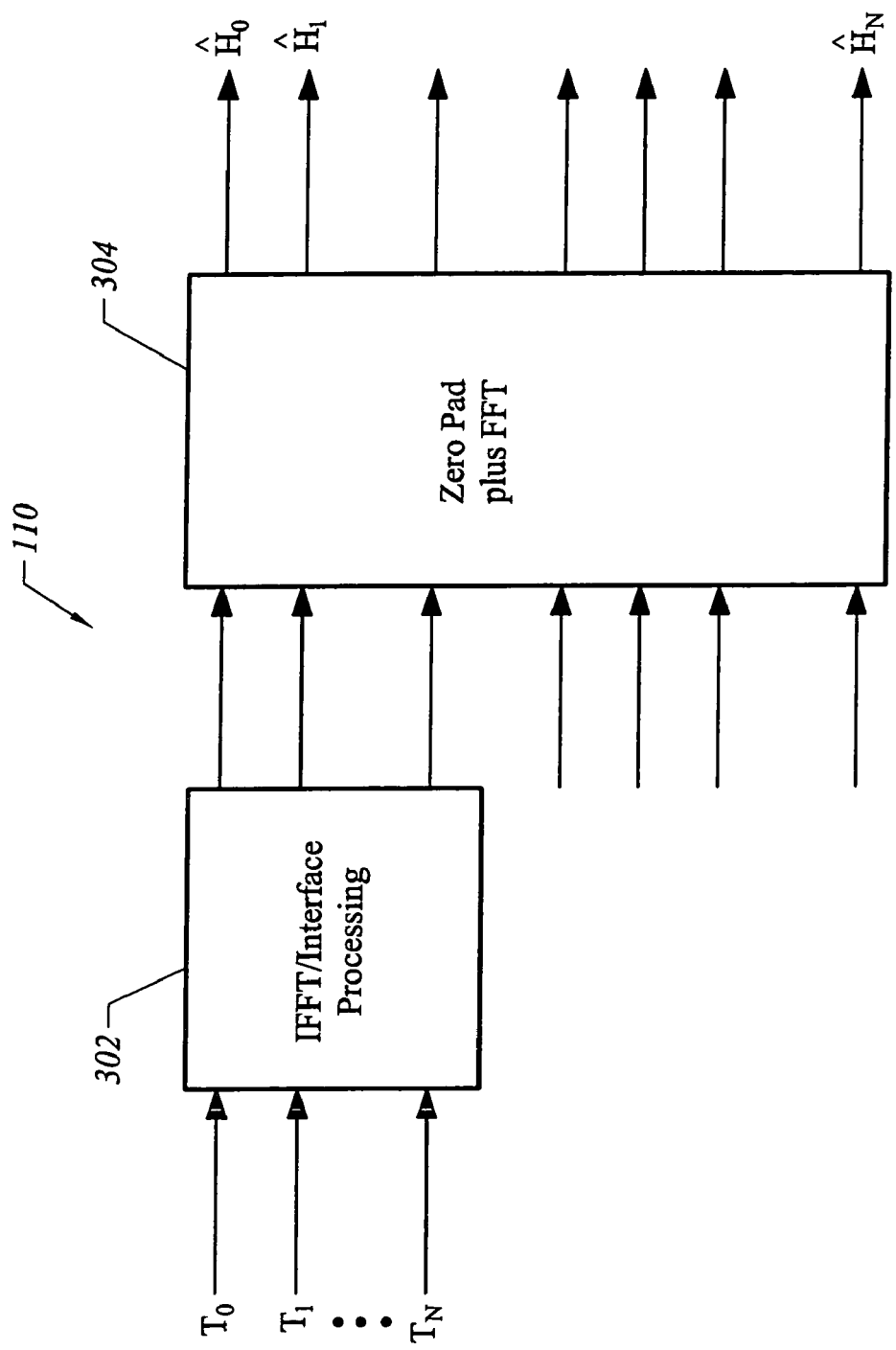
FIG. 3 is a top level diagram of channel estimation processing according to one embodiment of the present invention.

FIG. 3 is a top level view of channel estimation processor 110 according to one embodiment of the present invention. For each received OFDM frequency domain burst, received training symbols $T_1$ through $T_v$ are input to an IFFT/interference processing block 302. Block 302 estimates a channel impulse response based on a measurement of the noise and interference present on the training symbols and a weighted least mean square procedure. There are $v$ training symbols input to block 302 for each burst and block 302 generates $v$ symbols as part of an impulse response estimate or possibly fewer than $v$ symbols if certain ones of the training symbols are nulled due to their corruption by interference and/or noise. IFFT/interference processing block 302 preferably smoothes the impulse response estimate.

An FFT block 304 pads the end of the smoothed impulse response output by block 302 with 0's to extend the response to length N where N is the system burst length. FFT block 304 then applies the FFT to the zero padded impulse response estimate to obtain the channel response estimate.

Figure 4:
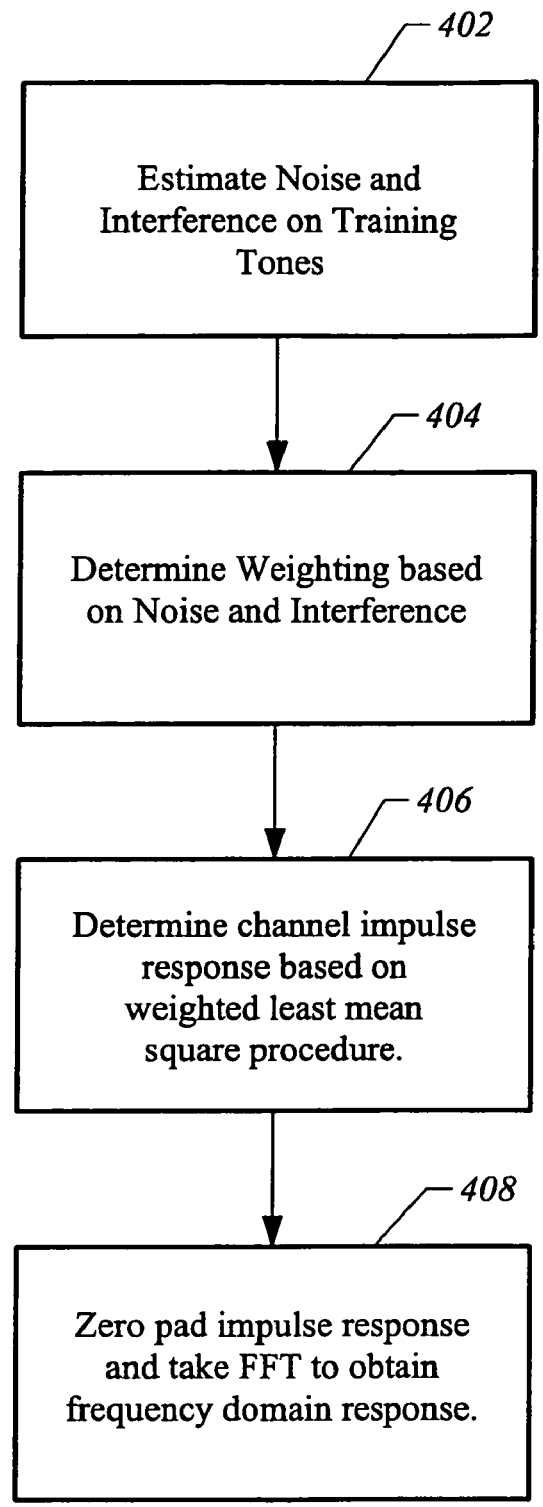
FIG. 4 is a top level flowchart describing steps of estimating a channel response in the presence of interference according to one embodiment of the present invention.

FIG. 4 is a flowchart describing steps of the operation of channel estimation processor 110 as depicted in FIG. 3. The estimation of noise and interference assumes that channel response will change slowly relative to OFDM burst rate and that therefore successive channel response values for each frequency domain symbol position will be highly correlated. For each received frequency domain symbol including each training symbol, the following expression will hold true:

$$X(n,k)=H(n,k)\cdot Z(n,k)+W(n,k)$$

where n denotes a frequency domain symbol position, k identifies each burst in chronological order, X denotes a received frequency domain symbol value, H refers to a channel response value, Z refers to a value as transmitted, and W refers to combined noise and/or interference superimposed on a particular frequency domain symbol. For n∈J where J is the set of frequency domain symbol positions allocated for use by training symbols, one can define a quantity:

$$V(n,k) \triangleq \frac{X(n,k)}{Z(n,k)} - \frac{X(n,k+1)}{Z(n,k+1)}$$

Because the channel response values are assumed to change slowly, one can then infer that $$V(n,k) \triangleq \frac{W(n,k)}{Z(n,k)} - \frac{W(n,k+1)}{Z(n,k+1)}$$

The quantity V(n,k) may be statistically characterized over time for each frequency domain position n∈J to find $$\sigma_v^2(n) = E_k |V(n,k)|^2.$$

For example, one could average V(n,k) over successive bursts by:

$$\sigma_v^2(n,k+1)=\beta|v(n,k)|^2+(1-\beta)\sigma_v^2(n,k)\forall n$$

The combined noise and/or interference energy, $$\sigma_W^2(n) = E_k |v(n,k)|^2,$$

will then be found by:

$$\sigma_W^2(n) = \frac{\sigma_v^2(n)|Z(n)|^2}{2}.$$

Once the noise and/or interference for each training symbol has been estimated by time averaging, a weighting among the training symbols is determined based on the measured noise and/or measured interference at step 404. The weighting is such that training symbols experiencing greater corruption by interference and/or noise will have less influence in determining the channel response estimate. The weighting may be characterized by a matrix R having dimensions v by v.

In one embodiment, the weighting is implemented by an effective nulling of one or more training symbols whose received values have been corrupted by interference. For example, one may always null the single training symbol that is most corrupted by interference. Alternatively, one may null the most corrupted training symbol only if the noise and/or interference energy on that symbol exceeds the threshold. Weighting matrix R then has the value 1 at each position along its diagonal corresponding to a training symbol that has not been nulled, the value 0 at each position along its diagonal corresponding to a nulled training symbol position, and 0 at all matrix positions off the diagonal. If greater complexity can be tolerated, a more exact channel response may be estimated by setting the values of weighting matrix R to be the $\sigma_W^2$, (n) values for each training symbol position along the diagonal and zero elsewhere.

At step 406, a weighted least squares procedure is used to estimate the channel impulse response. This procedure takes into account the weighting matrix R determined at step 404 to arrive at an estimate that considers interference. The expression $$h_{wls} = (Y_v^* R Y_v)^{-1} Y_v^* R \hat{H}$$

may be used to determine the weighted least squares impulse response where $\hat{H}$ is a vector consisting of each received training symbol divided by the known transmitted value, R is the weighting matrix described above, and $Y_{84}$ represents the v-point FFT matrix with elements $$Y_v(n, m) = \frac{1}{\sqrt{v}} e^{j2\pi nm/v}$$

where n and m vary between 0 and v−1.

In the embodiment that nulls certain training symbols to implement weighting, the weighted least square estimation procedure may be simplified. The simplified estimation procedure is described with reference to FIG. 5.

The impulse response is preferably smoothed by using an expression such as:

$$h(k+1) = \gamma h_{wls} + (1-\gamma) h(k)$$

At step 408, FFT block 304 zero pads the smoothed impulse response and takes the FFT of the result to determine the channel response estimate that can then be used for equalization.

Figure 5:
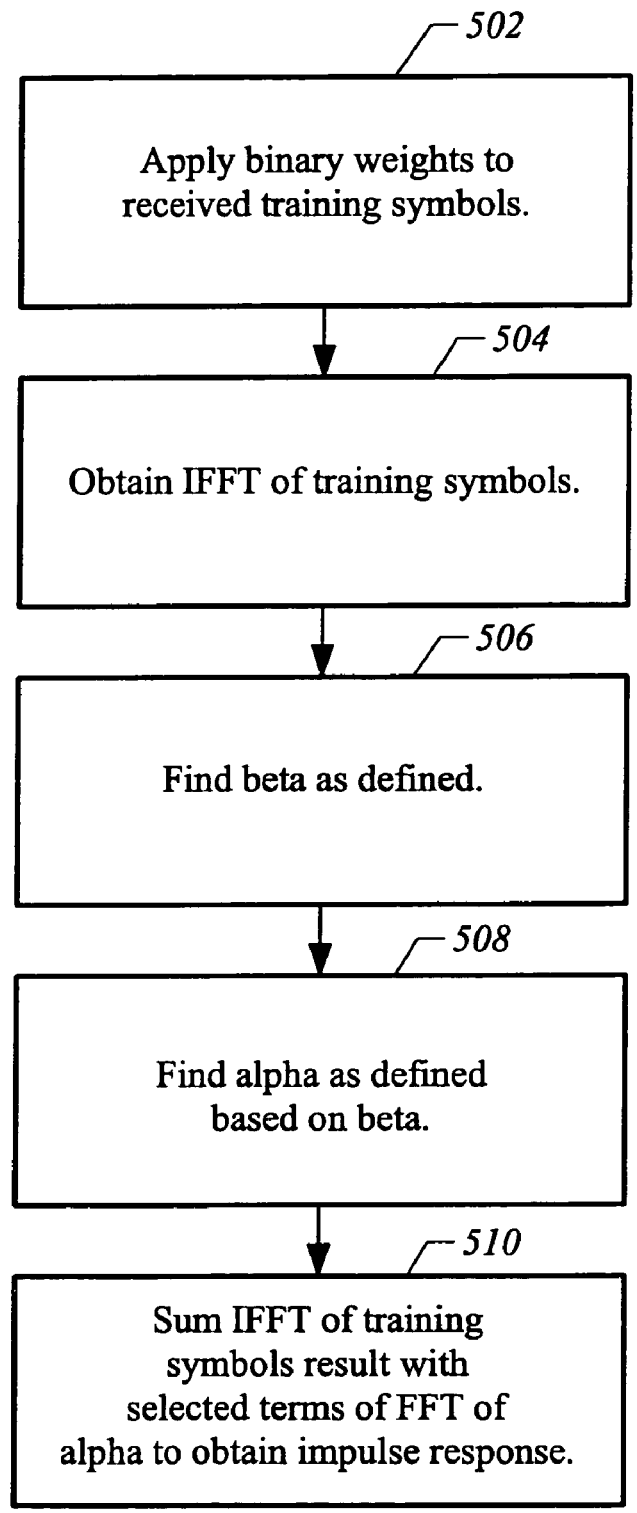
FIG. 5 is a flowchart describing detailed steps of estimating channel response in the presence of interference according to one embodiment of the present invention.

FIG. 5 is a flowchart describing a simplified procedure for applying a weighted least means square procedure to identify the impulse response. The procedure of FIG. 5 assumes that p training symbols are to be nulled by application of the weighting matrix R where p is greater than or equal to 1.

At step 502, the weighting matrix R is applied to the vector $\hat{H}$ by use of the following expression:

$$\overline{X} = R\hat{H}$$

where $\overline{X}$ is a vector having v complex components.

At step 504, the IFFT of the result of step 502 is obtained but the last p terms of this IFFT are discarded. This process may be characterized by the following expressions:

$$\overline{h} = [I_{v-p}] Y_v^*(\overline{X}) = Y_v^* \overline{X}$$

where $\overline{h}$ is a vector having v−p complex components and $Y_v^*$ represents the v-point IFFT matrix with elements $$Y_v(n, m) = \frac{1}{\sqrt{v}} e^{j2\pi nm/v}$$

where n and m vary between 0 and v−1.

At step 506, an expression β is found by zero padding the result of step 504 to include v elements and then taking the FFT but obtaining only those entries corresponding to training symbols that have been nulled. This process may be characterized by the expression $$\beta = Y_t^* [\overline{h}_o]$$

where β is a vector having p components, and
where $Y_t^*$ represents the rows of the v by v IFFT matrix corresponding to the positions of the training tones that have been nulled.

At step 508, an expression α is derived as follows:

$$\alpha = Q^{-1} \beta$$

where α is a vector having p complex elements, and where $$Q = v I_p - Y_t^* Y_t$$

where $I_p$ is the identity matrix having p rows and p columns.

Then at step 510, the impulse response is found by applying the expression:

$$h_{wls} = \overline{h} + Y_t \alpha$$

It will be appreciated that the channel response estimation technique described above may be applied to each of multiple receiver antennas. The procedure would be applied separately for each receiver antenna. Also, one may take into account known channel response components by applying the techniques of U.S. application Ser. No. 09/234,929.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. All publications, patents, and patent applications cited herein are hereby incorporated by reference.

What is claimed is:

1. In a digital communication system, a method for estimating a channel response, said method comprising:
   receiving a time domain OFDM burst;
   converting said time domain OFDM burst to a frequency domain OFDM burst;
   extracting a vector of training symbols having known transmitted frequency domain values from said frequency domain OFDM burst;
   determining weights for said frequency domain training symbols based on measured noise and/or interference as statistically characterized over time, such that the respective weights are indicative of the corruption by interference and/or noise that respective frequency domain training symbols experience; and using said weights and said training symbols to estimate said channel response for different frequency locations of the frequency domain OFDM burst, such that training symbols experiencing greater corruption by interference and/or noise have less influence on the channel response estimate than training symbols experiencing less corruption by interference and/or noise.

2. The method of claim 1 wherein said using said weights comprises employing a weighted least squares estimation procedure.

3. The method of claim 1 wherein said determining comprises determining a binary weight value (0 or 1) for each of said weights.

4. In a digital communication system, apparatus for estimating a channel response, said apparatus comprising:
- a receiver system that receives a time domain OFDM burst;
- a converter that converts said time domain OFDM burst to a frequency domain OFDM burst;
- an extraction block that extracts a vector of training symbols having known transmitted frequency domain values from said frequency domain OFDM burst; and
- a channel estimation block that determines weights for said training symbols based on measured noise and/or interference as statistically characterized over time and uses said weights and said training symbols to estimate said channel response, such that the respective weights are indicative of the corruption by interference and/or noise that respective frequency domain training symbols experience, and further such that training symbols experiencing greater corruption by interference and/or noise have less influence on the channel response estimate than training symbols experiencing less corruption by interference and/or noise.

5. The apparatus of claim 4 wherein said channel estimation block employs a least weighted least means squares estimation procedure to estimate said channel response.

6. The apparatus of claim 4 wherein said channel estimation block determines said weights based on interference statistics.

7. The apparatus of claim 4 wherein said channel estimation block determines a binary weight value (0 or 1) for each of said weights.

8. In a digital communication system, apparatus for estimating a channel response, said apparatus comprising:
- means for receiving a time domain OFDM burst;
- means for converting said time domain OFDM burst to a frequency domain OFDM burst;
- means for extracting a vector of training symbols having known transmitted frequency domain values from said frequency domain OFDM burst;
- means for determining weights for said frequency domain training symbols based on measured noise and/or interference as statistically characterized over time, such that the respective weights are indicative of the corruption by interference and/or noise that respective frequency domain training symbols experience; and
- means for using said weights and said training symbols to estimate said channel response for different frequency locations of the frequency domain OFDM burst, such that training symbols experiencing greater corruption by interference and/or noise have less influence on the channel response estimate than training symbols experiencing less corruption by interference and/or noise.

9. The apparatus of claim 8 wherein said means for using said weights comprises means for employing a weighted least squares estimation procedure.

10. The apparatus of claim 8 wherein said means for determining comprises means for determining a binary weight value (0 or 1) for each of said weights.

* * * * *